United States Patent [19]

LoCascio

[11] Patent Number: 4,779,037
[45] Date of Patent: Oct. 18, 1988

[54] DUAL INPUT LOW DROPOUT VOLTAGE REGULATOR

[75] Inventor: James J. LoCascio, San Jose, Calif.

[73] Assignee: National Semiconductor Corporation, Santa Clara, Calif.

[21] Appl. No.: 121,613

[22] Filed: Nov. 17, 1987

[51] Int. Cl.$^4$ ............................................. G05F 1/565
[52] U.S. Cl. ................................. 323/275; 323/281; 323/303; 307/48
[58] Field of Search ............................ 307/44, 48, 66; 323/269, 275, 280, 281, 303; 365/229

[56] References Cited

U.S. PATENT DOCUMENTS

| | | | |
|---|---|---|---|
| 4,209,710 | 6/1980 | Quarton | 307/66 |
| 4,354,118 | 10/1982 | Spencer | 307/66 |
| 4,384,350 | 5/1983 | Lee et al. | 365/229 |
| 4,543,522 | 9/1985 | Moreau | 323/303 |
| 4,645,943 | 2/1987 | Smith et al. | 307/66 |
| 4,716,354 | 12/1987 | Hacker | 323/303 |

Primary Examiner—Patrick R. Salce
Assistant Examiner—Jeffrey Sterrett
Attorney, Agent, or Firm—Limbach, Limbach & Sutton

[57] ABSTRACT

A low dropout voltage regulator with a switched redundant input, which has low dropout voltage before, during, and after a switch to the redundant input. In a preferred embodiment, the inventive voltage regulator includes two transistors that are controlled by the output of an error amplifier, and redundant input voltage sources. A first one of the transistors conducts when a first input voltage is greater than a second input voltage. The other transistor conducts when the second input voltage exceeds the first input voltage. When both input voltages are have substantially equal magnitude, both transistors conduct. In a preferred embodiment, one input voltage is supplied by a battery, and the other is supplied by a storage capacitor charged by the battery. When the battery fails, the storage capacitor will discharge, thus serving as a time-varying redundant voltage source in the event of battery failure.

14 Claims, 3 Drawing Sheets

DUAL INPUT LOW DROPOUT VOLTAGE REGULATOR

FIELD OF THE INVENTION

The invention relates generally to self-switched redundant input voltage regulator circuits. More specifically, the invention relates to self-switched redundant input voltage regulator circuits having low dropout differential voltage regardless of the relative magnitude of the input voltage signals.

BACKGROUND OF THE INVENTION

In a typical conventional integrated circuit voltage regulator such as that shown in FIG. 1, an error amplifier (amplifier 1) is employed to compare a reference voltage VR (which is a 1.25 volt signal in the FIG. 1 example) with a signal proportionaly to the output voltage. The amplifier output controls a transistor (PNP transistor 2) through which the output current flows, by adjusting the transistor so that the output voltage (Vout) equals a fixed multiple of the reference voltage (kVR). A source voltage (sometimes referred to herein as an "input voltage"), which may be unregulated, is supplied to the emitter of the transistor.

A voltage regulator may be characterized by its "dropout voltage," which is the lowest source voltage which will allow the regulator output voltage to remain substantially constant at kVR, the above-mentioned fixed multiple of the reference voltage. If the source voltage drops below the dropout voltage, then the regulator's output voltage will decrease below kVR.

In the conventional FIG. 1 circuit, a redundant source voltage (V IN) is supplied to the emitter of transistor 2. The source voltage is redundant in the sense that the source voltage is normally supplied through diode D from a battery (and hence is denoted V BAT), but if the battery fails, the source voltage supplied to transistor 2 is the time-varying voltage $V_c$ across capacitor $C_1$ ($V_c$ varies as capacitor $C_1$ discharges). The use of diode D for switching to the redundant input voltage $V_c$ is undesirable because it causes the FIG. 1 circuit to have a high dropout voltage.

It has not been known until the present invention how to construct a low dropout voltage regulator with a switched redundant input, which will have low dropout voltage before, during, and after a switch to the redundant input.

SUMMARY OF THE INVENTION

The inventive voltage regulator includes two transistors that are controlled by the output of an error amplifier, and redundant input voltage sources "V BAT" and "VCC". A first one of the transistors conducts when V BAT is greater than VCC. The other transistor conducts when VCC is greater than V BAT. When V BAT and VCC have equal magnitude, both transistors conduct. The inventive circuit has low dropout voltage regardless of the relative magnitude of V BAT and VCC.

In a preferred embodiment, V BAT is supplied by a battery, and VCC is supplied by a storage capacitor charged by the battery. When the battery fails, the storage capacitor will discharge. The discharging storage capacitor thus serves as a time-varying redundant voltage source in the event of battery failure.

DETAILED DESCRIPTION OF THE PREFERRED EMBODIMENTS

Figure 2:
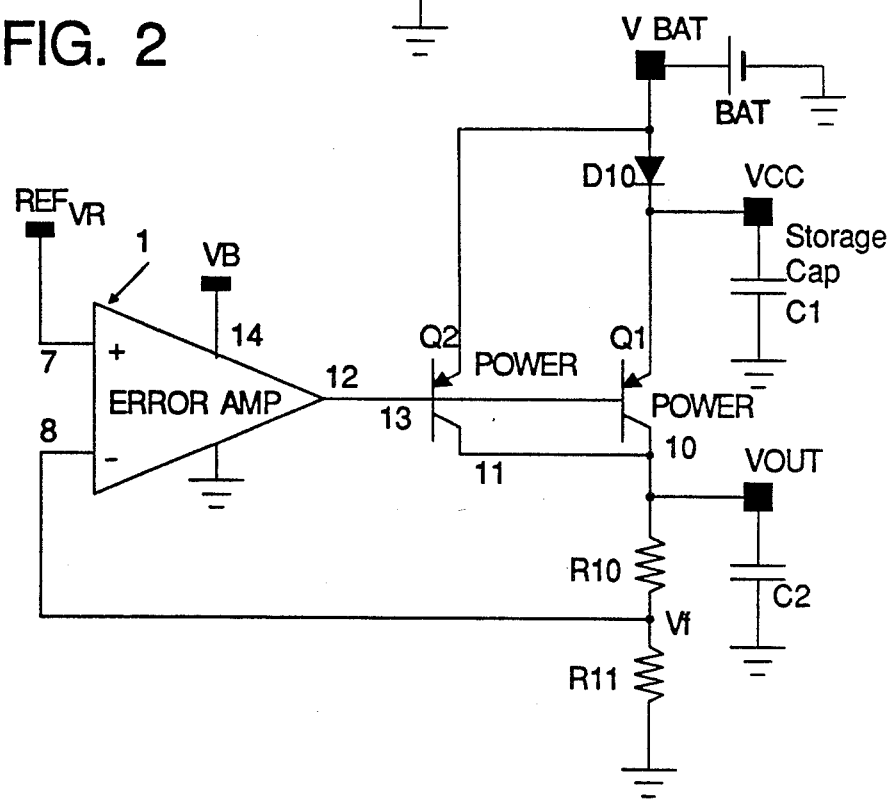
FIG. 2 is a schematic circuit diagram of a preferred embodiment of the voltage regulator of the invention.

FIG. 2 is a schematic diagram of a preferred embodiment of the invention. Reference voltage signsl VR is supplied to non-inverting input terminal 4 of conventional error amplifier 1. The base of series pass PNP transistor Q1, and the base of series pass PNP transistor Q2, are connected to the output terminal of error amplifier 1.

Collector 10 of transistor Q1 is connected through resistor $R_{10}$ to inverting terminal 5 of amplifier 1. Similarly, collector 11 of transistor Q2 is connected through resistor $R_{10}$ to inverting terminal 5 of amplifier 1. A signal (Vf) proportional to the output voltage Vout is thus fed back through resistor $R_{10}$ to inverting input terminal 5 of amplifier 1. Amplifier 1 compares the voltage signals supplied to input terminals 4 and 5 and generates an output signal, whose amplitude is proportional to the difference between the reference voltage VR and voltage signal Vf, for controlling the base of each of transistors Q1 and Q2. Output voltage terminal Vout is connected above ground by external stabilization capacitor $C_2$, and resistor $R_{11}$ is connected between ground and the node labelled Vf. Voltage source $V_B$ is connected to bias terminal 14 of error amplifier 1 in order to provide bias current for error amplifier 1 in a conventional manner.

Figure 1:
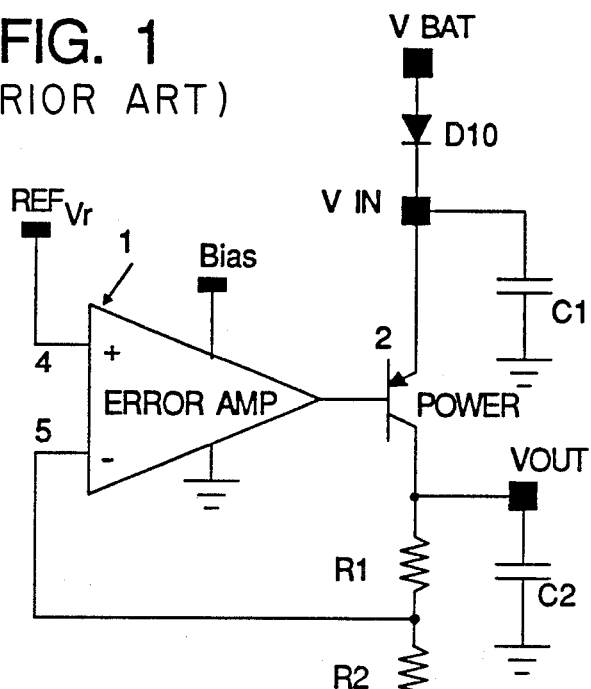
FIG. 1 is a schematic circuit diagram of a conventional redundant input voltage regulator.

Assuming first that the emitter of transistor $Q_1$ is at sufficiently high potential that transistor $Q_1$ is conducting, if the voltage supplied to input terminal 5 of amplifier 1 increases above reference voltage VR (which may be equal to 1.25 volts as in FIG. 1 but need not be equal to 1.25 volts), then the output of amplifier 1 will increase the voltage supplied to the base of transistor Q1, thus reducing $V_{BE}$ and decreasing the current flow through transistor $Q_1$ until Vout decreases to the desired output valve kVR. Similarly, if the voltage supplied to terminal 5 of amplifier 1 drops below VR, then the output voltage of amplifier 1 will decrease, increasing $V_{BE}$ of transistor Q1 and raising Vout back to the desired output value kVR. In a mode in which transistor Q2 is conducting feedback through resistor $R_{10}$, output terminal 12 of amplifier 1, and base 13 of transistor Q2 permits amplifier 1 to control transistor Q2 in the same manner as it controls transistor Q1.

Due to the presence of diode $D_{10}$ between storage capacitor $C_1$ and the emitter of transistor Q2 (and the absence of a diode between capacitor $C_1$ and the emitter of transistor Q1), current will flow through transistor Q2 only if V BAT is greater than or equal to VCC. If VCC is greater than V BAT, then current will flow through transistor Q1 but no significant current will flow through transistor Q2. In a mode in which VCC is equal to V BAT, current will flow through both transistors Q1 and Q2.

If V BAT is initially greater than VCC, V BAT will charge storage capacitor $C_1$ through diode $D_{10}$ until VCC equals V BAT minus the voltage drop across diode $D_{10}$. If V BAT then decreases to below VCC (for example, if a battery associated with V BAT fails), capacitor $C_1$ will discharge and the associated time-varying voltage will cause transistor Q1 to remain conducting after current has ceased to flow through transistor Q2.

The FIG. 2 circuit operates with substantially the same low dropout voltage, and with substantially the same stability regardless of the relative magnitude of VCC and V BAT, and before, during, and after a sudden decrease in the magnitude of V BAT. The FIG. 3 circuit shares these characteristics with the FIG. 2 circuit. Additionally, however, the FIG. 3 embodiment of the invention includes additional circuit components for the purpose of enhancing the circuit's stability in a wider range of operating modes.

Figure 3:
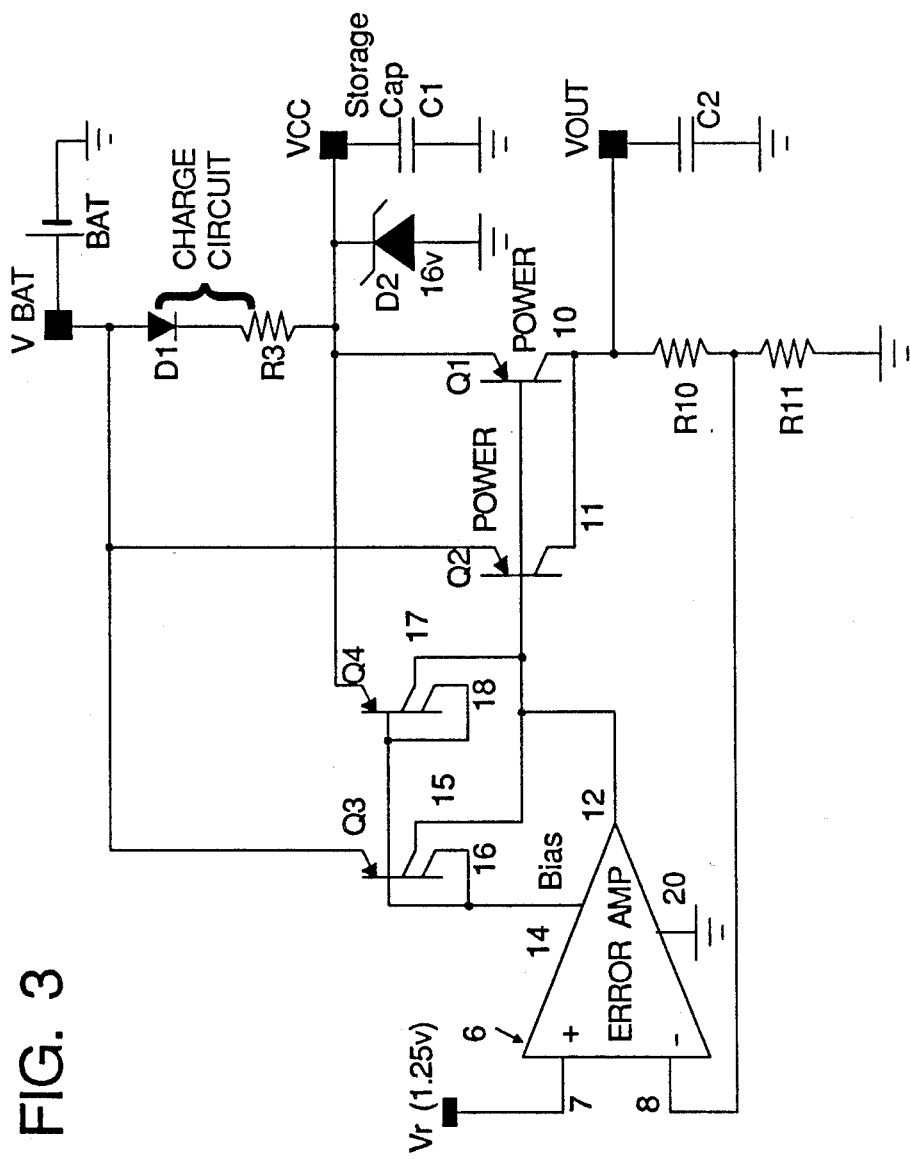
FIG. 3 is a schematic circuit diagram of another preferred embodiment of the inventive voltage regulator.

The FIG. 3 circuit includes transistors Q1 and Q2, resistors $R_{10}$ and $R_{11}$, external storage capacitor $C_1$, a source of reference voltage VR, and a source of input voltage V BAT, which are connected as are the corresponding components of the FIG. 2 circuit. Diode $D_1$ and resistor $R_3$ comprise a charging circuit for capacitor $C_1$ which corresponds to that including diode $D_{10}$ of FIG. 2. Zener diode $D_2$ is preferably connected between voltage source VCC and the emitter of transistor Q1, to permit use of a physically smaller, less expensive capacitor $C_1$ than would be required absent Zener diode $D_2$.

Error amplifier 6 performs the same function as that performed by amplifier 1 in the FIG. 2 circuit, but is so connected to the other circuit elements that its output drive capability, which is controlled by the magnitude of the bias current at bias terminal 14, varies in response to the error amplifier output current at output terminal 12. The other bias terminal 20 of error amplifier 6 is connected to ground. Error amplifier 6 has conventional design, as does error amplifier 1.

The amount of bias current at terminal 14 of amplifier 16 is determined by the state of multiple collector PNP transistors Q3 and Q4. Each of transistors Q3 and Q4 is constructed in a manner well known in the art of integrated circuit fabrication. The emitters of transistors Q3 and Q4 are respectively connected to emitters of transistors Q2 and Q1. First collector 15 of transistor Q3 is connected to first collector 17 of transistor Q4 and to the base of transistor Q1 and the base of transistor Q2. Second collector 16 of transistor Q3 is connected to the base of transistor Q3 and to bias terminal 14 of error amplifier 6. Second collector 18 of transistor Q4 is connected to the base of transistor Q4 and to bias terminal 14 of error amplifier 6.

Transistors Q3 and Q4 function as a current mirror to enhance the stability of the FIG. 3 circuit by causing the amplitude of the error amplifier bias current (at bias terminal 14) to be proportional to the amplitude of the error amplifier output current (at output terminal 12). It will be apparent from this specification to those of ordinary skill in the art how to design and construct alternative means for performing the current mirroring function performed by transistors Q3 and Q4 in FIG. 3.

Figure 4:
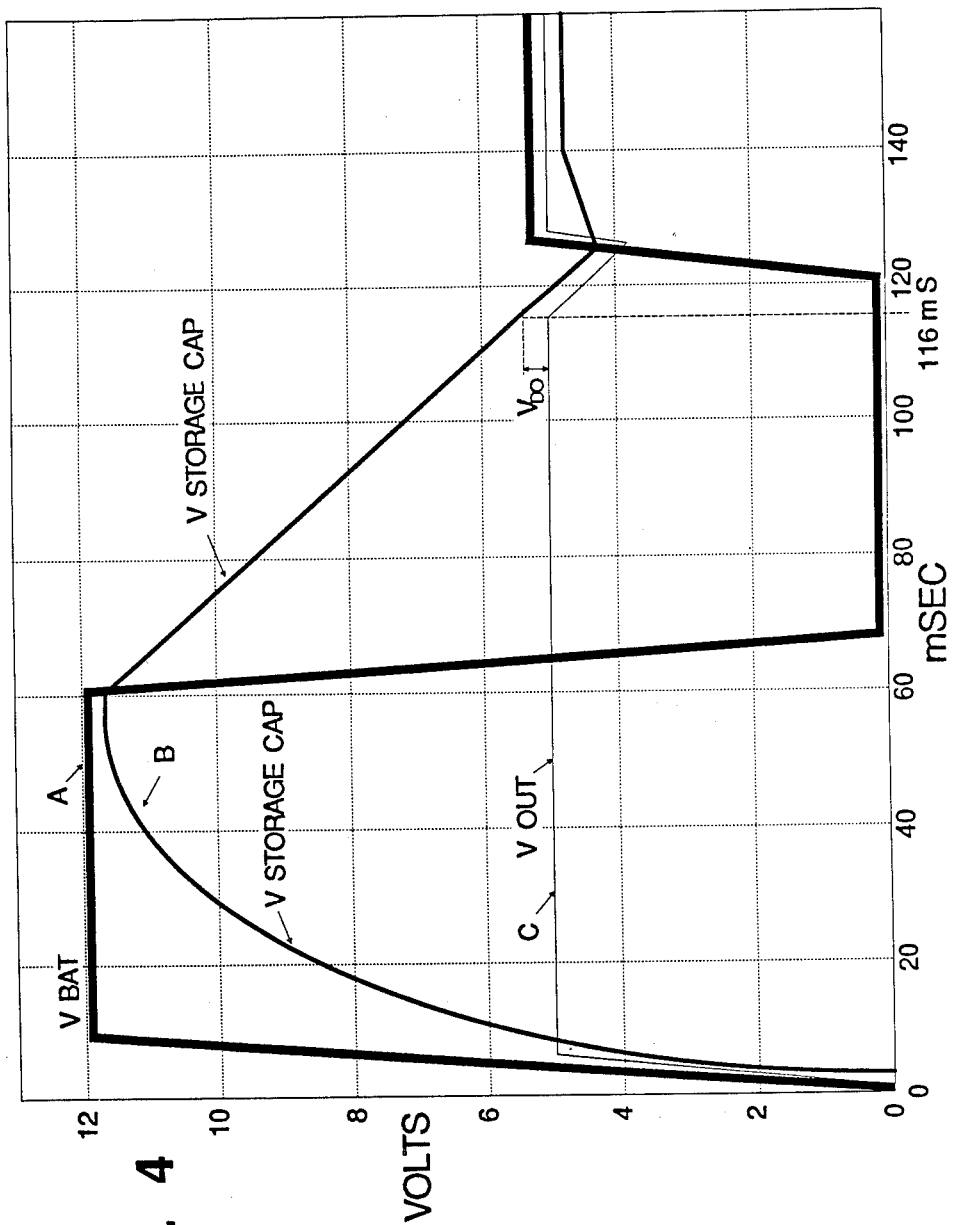
FIG. 4 is a graph of typical input and output voltage characteristics of a voltage regulator embodying the invention.

Typical response curves characterizing either embodiment of the inventive circuit are set forth in FIG. 4. FIG. 4 assumes that storage capacitor $C_1$ has capacitance in the range 200 to 500 microfarads, and that VR, and resistors $R_{10}$ and $R_{11}$ are chosen so that desired output voltage (kVR) is 5 volts. Curve A of FIG. 4 represents input voltage V BAT, curve B represents redundant input voltage VCC (the voltage across the storage capacitor), and curve C represents output voltage Vout. Assuming that V BAT and VCC are initially zero, when V BAT is increased to 12 volts, output voltage Vout will rapidly rise to 5 volts (in less than 10 msec), and VCC will rise exponentially to a level slightly less than 12 volts. Because V BAT exceeds VCC in this period, a first one of transistors Q1 and Q2 (Q1 in FIGS. 2 and 3) will be conducting during this period. At t=60 msec, V BAT commences a sudden decrease to zero (as shown in FIG. 4) or to a value below zero. However, due to the relatively long time constant associated with the storage capacitor, VCC will remain above the dropout voltage of the circuit until t=116 msec, so that the output voltage Vout will not drop below 5 volts until t=116 msec. During the period from just after t=60 msec to t=116 msec, the other one of transistors Q1 and Q2 (Q2 in FIGS. 2 and 3) will be conducting. If the differential dropout voltage $V_{DO}$ is defined as the difference between the dropout voltage (approximately 5.3 volts in the FIG. 4 example) and the desired output voltage (5 volts in the FIG. 4 example), then $V_{DO}$ is equal to approximately 300 mV in the FIG. 4 example.

Extremely low differential dropout voltage, typically within the range 200 mV to 700 mV (with the specific value in this range being dependent on the output current and the circuit operating temperature) is a characteristic of the inventive circuit. Even in an operating mode (not indicated in the FIG. 4 graph for simplicity) in which V BAT slowly decreases to the level of the desired output voltage yet remains greater than VCC at all times when V BAT exceeds the dropout voltage (in contrast with the operating mode occurring between t=60 msec and t=120 msec in the FIG. 4 example), the differential dropout voltage of the inventive circuit will remain extremely low, typically in the range 200 mV to 700 mV.

In the FIG. 3 embodiment, storage capacitance $C_1$ is preferably in the range 200 to 500 microfarads, diode $D_1$ preferably has a reverse breakdown voltage greater than 50 volts, resistance $R_3$ is preferably in the range 200 to 500 ohms, and zener diode $D_2$ preferably has reverse breakdown voltage in the range 16 to 18 volts. V BAT will typically be less than 26 volts, output capacitance $C_2$ will typically be on the order of 10 microfarads, and (when the input voltage exceeds the dropout voltage) the output voltage Vout will typically be within 0.5 volts or less or a desired voltage (kVR) in the range 5.0 to 10.0 volts, with a differential dropout voltage in the range 200 mV-700 mV, provided the output current (at the Vout terminal) does not exceed a maximum of up to about 300 mA and the circuit operating temperature remains in the range from about −(40° C.) to about +125° C.

The FIG. 2 and FIG. 3 embodiments (or variations thereon) will preferably be implemented in integrated circuit form, in a manner that will be apparent from this specification to those of ordinary skill in the art. However, these embodiments (or variations thereon) may alternatively be implemented using discrete circuit components.

The above description is merely illustrative and explanatory of the present invention. The inventor contemplates numerous variations in the details of circuit design and mode of operation, and numerous alternative embodiments and equivalents that are within the spirit and scope of the invention and will occur to persons of ordinary skill in the art upon reading the foregoing disclosure. Accordingly, it is intended that such variations, alternative embodiments, and equivalents will be within the scope of the appended claims.

What is claimed is:

1. A low dropout, switched redundant input, voltage regulator, including:
   (a) an output terminal for providing an output voltage;
   (b) a reference voltage source for providing a reference voltage signal:
   (c) a first variable current means for generating a first current output signal whose magnitude varies in response to a first input voltage signal and a control signal;
   (d) a second variable current means for generating a second current output signal whose magnitude varies in reponse to a second input voltage signal and said control signal;
   (e) means for generating said control signal by comparing said reference voltage signal with the first current output signal and the second current output signal.

2. The apparatus of claim 1, wherein the first variable current means includes a first transistor including a first emitter which receives the first input voltage signal and a first base which receives the control signal, and wherein the second variable current means includes a second transistor including second emitter which receives the second input voltage signal and a second base which receives the control signal.

3. The apparatus of claim 2, wherein element (e) is an error emplifier including first input terminal for receiving the reference voltage signal and a second input terminal for receiving a feedback signal whose magnitude varies in response to both the first current output signal and the second current output signal.

4. The apparatus for claim 1, also including:
   (f) a battery for supplying the first input voltage signal;
   (g) a storage capacitor for supplying the second input voltage signal; and
   (h) means for preventing current from flowing from the storage capacitor to the first variable current means when the magnitude of the second voltage signal exceeds the magnitude of the first voltage signal.

5. The apparatus of claim 1, wherein the magnitude of the control signal varies in response to a bias current at a bias terminal of element (e), and also including:
   (j) means for generating the bias current in such a manner that the amplitude of the bias current is proportional to the amplitude of the control signal.

6. The apparatus of claim 5, wherein element (j) includes current mirroring means connected between elements (c) and (d) and the bias terminal of element (e).

7. A low dropout, switched redundant input, voltage regulator, including:
   an output terminal for providing an output voltage;
   a first input voltage terminal for providing a first input voltage signal;
   a second input voltage terminal for providing a second input voltage signal;
   a reference voltage source;
   first variable current means connected between the first input voltage terminal and the output terminal and capable of producing a first output current signal whose magnitude varies in response to a control signal;
   second variable current means connected between the second input voltage terminal and the output terminal and capable of producing second output current signal whose magnitude varies in response to the control signal; and
   control means for controlling the first output current signal and the second output current signal by generating the control signal in such a manner that magnitude of the control signal is proportional to the difference between the reference voltage and a signal proportional to the output voltage.

8. The apparatus of claim 7, wherein the magnitude of the control signal varies in response to a bias current at a bias terminal of the control means, and including:
   means for generating the bias current in such a manner that the amplitude of the bias current is proportional to the amplitude of the control signal.

9. The apparatus of claim 7, wherein the first variable current means includes a first transistor electrically connected with the first input voltage terminal, and the second variable current means includes a second transistor electrically connected with the second input voltage terminal.

10. The apparatus of claim 9, wherein the first transistor includes a first emitter connected to the first input voltage terminal and a first base which receives the control signal, and wherein the second transistor includes a first emitter connected to the second input voltage terminal and a second base which receives the control signal.

11. The apparatus of claim 10, wherein the second transistor includes a collector from which the second output current signal emerges.

12. The apparatus of claim 7, also including:
    a battery for supplying the first input voltage signal; and
    a storage capacitor for supplying the second input voltage signal.

13. The apparatus of claim 12, also including a charge circuit for charging the storage capacitor from the battery.

14. The apparatus of claim 13, wherein the charge circuit includes a diode which prevents significant current flow from the storage capacitor to the first variable current means.

* * * * *